Patented Jan. 6, 1925.

1,522,089

UNITED STATES PATENT OFFICE.

HERMANN WAGNER, OF HOCHST-ON-THE-MAIN, AND OTTO SOHST, OF HANAU-ON-THE-MAIN, GERMANY, ASSIGNORS TO FARBWERKE VORM. MEISTER LUCIUS & BRUNING, OF HOCHST-ON-THE-MAIN, GERMANY, A CORPORATION OF GERMANY.

AZODYESTUFFS AND PROCESS OF MAKING THE SAME.

No Drawing.  Application filed December 26, 1923. Serial No. 682,819.

*To all whom it may concern:*

Be it known that we, HERMANN WAGNER and OTTO SOHST, citizens of Germany, residing at Hochst-on-the-Main, Germany, and Hanau-on-the-Main, Germany, have invented certain new and useful Improvements in Azodyestuffs and Processes of Making the Same, of which the following is a specification.

We have found that dyestuffs or dyeings of excellent fastness are produced by coupling the diazo-compounds obtained from the alkyl-, aryl- and aralkylamides of the alkyloxy-3-amino-1-benzoic acids with any arylamides of the 2.3-hydroxynaphthoic acid. By this process there are obtained dyestuffs of an excellent clear red tint with a blue hue possessing the important property of being utilizable for the production of fast alizarine-pink-shades.

*Examples.*

1. The diazo compound prepared as usual from 24,2 kg. 3-amino-4-methoxy-1-benzoic acid anilide is run while stirring into an aqueous suspension of 26 kg. of 2.3-hydroxynaphthoic acid o-toluidide ($CH_3 : NH_2 = 1 : 2$) prepared by dissolving it in caustic soda solution and reprecipitation with diluted acetic acid. The dyestuff separates as a red precipitate; it is filtered, washed and dried.

2. *Pink shades upon yarn.*—The yarn is impregnated with the following solution:

1,06 g. of 2.3-hydroxynaphthoic acid-o-toluidide ($CH_3 : NH_2 = 1 : 2$), 2 ccm. of caustic soda solution 34° Bé., 3 ccm. of sodium Turkey red oil 50%, 50 ccm. of hot water are made up to 1 litre with cold water. The impregnated yarn is wound off and dyed in the following diazo solution.

1,6 g. of 3-amino-4-methoxy-1-benzoic acid anilide are pasted with 1,7 ccm. of hydrochloric acid 22° Bé. and 25 ccm. of water, cooled by addition of 25 ccm. of ice and mixed while stirring with a solution of 0,5 ccm. of sodium nitrite in 10 ccm. of water. The whole is made up with cold water to 1 litre and before use mixed with 1,34 g. of sodium acetate.

After dyeing the material is well washed and soaped.

3. The material is padded with a solution of: 21,1 g. of 2.3-hydroxynaphthoic acid o-toluidide ($CH_3 : NH_2 = 1 : 2$), 60 ccm. of caustic soda solution 22° Bé., 20 g. of Pará soap PN. made up to 1 litre.

Then there is dried and printed with the following colour:

24,2 g. of 3-amino-4-methoxy-1-benzoic acid anilide are well pasted with 140 ccm. of water and 24 ccm. of hydrochloric acid 22° Bé., cooled with 150 g. of ice and there are added 8 g. of sodium nitrite dissolved in 50 ccm. of water, the whole is stirred into 524 g. of tragacanth 60:1000, there are then added 60 g. of aluminium sulphate 1:1 dissolved in water and, before use, 20 g. of sodium phosphate, ca.

The reaction involved in the foregoing examples 1, 2 and 3 is as follows:

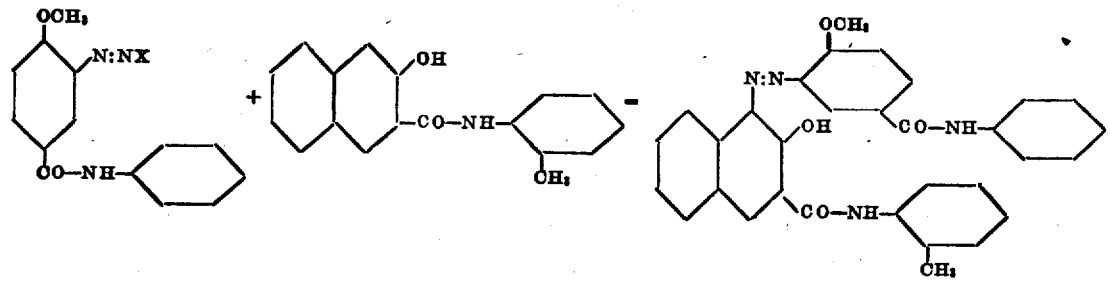

in which X stands for any acid residue.

4. The material is padded with a solution of:

24,9 g. of 2.3-hydroxynaphthoic acid 4-chloro-2-anisidide ($NH.OCH_3.Cl = 1 : 2 : 5$), 80 ccm. of caustic soda solution 22° Bé., 20 g. of Pará soap PN, made up to 1 litre, then printed with the printing colour mentioned in example 2.

The reaction involved in this example is similar to that of examples 1, 2 and 3, the formula of the 2.3-hydroxynaphthoic acid- 4-chloro-2-anisidide acid involved being:

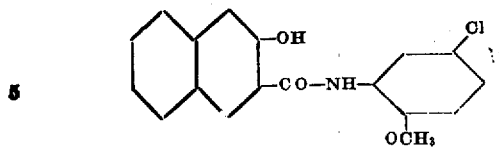

5. The hereafter mentioned diazo-solution is slowly added while stirring to the solution of sodium 2.3-hydroxynaphthoic acid 5-chloro-2-toluidide mixed with sulphate of barium serving as a substratum and after the setting of the precipitate, it is decanted several times as usual with pure water, filtered off and dried. The prescription yields a four per cent lake of the unsoluble azo-dyestuff.

*Diazo-solution.*

2,42 g. of 3-amino-4-methoxy-1-benzoic acid anilide are dissolved in 200 ccm. of warm water and 2,4 ccm. of hydrochloric acid 22° Bé. cooled with 600 ccm. of cold water and 100 g. of ice, then there are added 0,8 g. of sodium nitrite dissolved in 16 ccm. of water, and before use there are added 2 g. of sodium acetate, the whole is made up to 1 litre and, as above indicated, stirred into 3,12 g. of 2.3-hydroxynaphthoic acid 5-chloro-2-toluidide (NH.CH$_3$.Cl=1:2:4), 10,5 ccm. of caustic soda solution 22° Bé., 136 g. of sulphate of barium made up to 1 litre.

The sodium salt of the 2.3-hydroxynaphthoic acid-5-chloro-2-toluidide of the foregoing example has the formula:

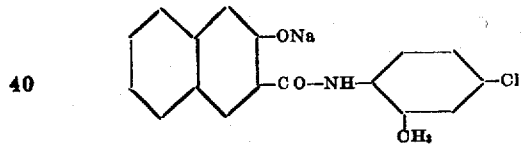

6. The yarn is impregnated with the following solution:
1,25 g. of hydroxynaphthoic acid-4-chloro-2-anisidide (NH.OCH$_3$.Cl=1:2:5), 2,7 ccm. of caustic soda solution 34° Bé., 3 ccm. of sodium Turkey red oil 50%, 50 ccm. of hot water, with cold water made up to 1 litre.

The impregnated yarn is wound off and dyed with the following diazo-solution:

1,6 g. of 3-amino-4-methoxy-1-benzoic acid anilide are pasted with 1,7 ccm. of hydrochloric acid 22° Bé. and 25 ccm. of water, then cooled by addition of 25 ccm. of ice and mixed while stirring with a solution of 0,5 g. of sodium nitrite in 10 ccm. of water and with cold water made up to 1 litre, before use there are added 1,34 g. of sodium acetate.

After dyeing it is washed and soaped.

A clear pink with a blue hue is obtained.

If the 3-amino-4-methoxy-1-benzonic acid anilide; used in Ex. 6 is replaced by an equivalent quantity of 3-amino-4-ethoxy-1-benzoic acid anilide or of the 3-amino-4-methoxy-1-benzoic acid-2-toluidide, there are produced very similar pink shades, whereas by using 3-amino-4-methoxy-1-benzoic acid ethylanilide there is obtained a pink with a somewhat yellower hue. Pink shades all of a somewhat yellower hue, are produced, if the 2.3-hydroxynaphthoic acid-4-chloro-2-anisidide, mentioned in example 6 is replaced by an equivalent quantity of 2.3-hydroxynaphthoic acid-5-chloro-2-toluidide, (CH$_3$:NH$_2$:Cl=1:2:5) and if the latter is coupled with the aforesaid diazo-compounds.

The 3-amino-4-ethoxy-1-benzoic-acid-anilide, 3-amino-4-methoxy-1-benzoic acid-2-toluidide and 3-amino-4-methoxy-1-benzoic acid ethylanilide referred to have the formulæ

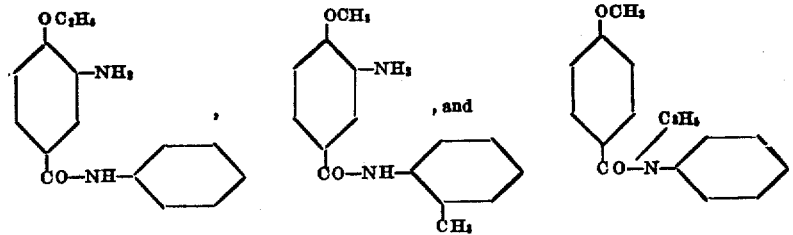

Instead of the components cited in the examples, there may be used the equivalent quantities of other 2.3-hydroxynaphthoic acid arylides as for instance the anilide, the chloro-anilides, the phenetidides, the naphthalides as well as also equivalent quantities of other alkyloxy-m-amido benzoic acid arylides substituted in the acid amine residues.

By alkyloxy-3-amino-1-benzoic acids we mean not only the parent compounds but also their homologues and substitution products.

Having now described our invention, what we claim is:

1. As new products the dyestuffs obtainable by coupling the diazo compounds of alkyl-aryl-and aralkyl amides of the alkyloxy-3-amino-1-benzoic acids with any 2.3-hydroxynaphthoic acid arylides which, on reduction yield an aromatic amine and an arylide of the 1-amino-2-hydroxy-3-naphthoic-acid.

2. Process for preparing azo-dyestuffs which consists in coupling the diazo compounds of alkyl- aryl- and aralkylamides of the alkyloxy-3-amino-1-benzoic acids with any 2.3-hydroxynaphthoic acid arylamides.

In testimony whereof, we affix our signatures.

HERMANN WAGNER.
OTTO SOHST.

Witnesses:
C. C. L. B. WYLES,
JANE SLIESTI.

2.3-hydroxynaphthoic acid arylides which, on reduction yield an aromatic amine and an arylide of the 1-amino-2-hydroxy-3-naphthoic-acid.

2. Process for preparing azo-dyestuffs which consists in coupling the diazo compounds of alkyl- aryl- and aralkylamides of the alkyloxy-3-amino-1-benzoic acids with any 2.3-hydroxynaphthoic acid arylamides.

In testimony whereof, we affix our signatures.

HERMANN WAGNER.
OTTO SOHST.

Witnesses:
C. C. L. B. WYLES,
JANE SLIESTI.

Certificate of Correction.

It is hereby certified that in Letters Patent No. 1,522,089, granted January 6, 1925, upon the application of Hermann Wagner, of Hochst-on-the-Main, and Otto Sohst, of Hanau-on-the-Main, Germany, for an improvement in "Azodyestuffs and Processes of Making the Same," errors appear in the printed specification requiring correction as follows: Page 1, line 68, after "ca." insert *1 kg;* page 2, line 63, for the misspelled word "benzonic" read *benzoic;* same page, line 93, following the formulæ, insert the word *respectively;* and that the said Letters Patent should be read with these corrections therein that the same may conform to the record of the case in the Patent Office.

Signed and sealed this 10th day of March, A. D. 1925.

[SEAL.]

KARL FENNING,
*Acting Commissioner of Patents.*

Certificate of Correction.

It is hereby certified that in Letters Patent No. 1,522,089, granted January 6, 1925, upon the application of Hermann Wagner, of Hochst-on-the-Main, and Otto Sohst, of Hanau-on-the-Main, Germany, for an improvement in "Azodyestuffs and Processes of Making the Same," errors appear in the printed specification requiring correction as follows: Page 1, line 68, after "ca." insert *1 kg;* page 2, line 63, for the misspelled word "benzonic" read *benzoic;* same page, line 93, following the formulæ, insert the word *respectively;* and that the said Letters Patent should be read with these corrections therein that the same may conform to the record of the case in the Patent Office.

Signed and sealed this 10th day of March, A. D. 1925.

[SEAL.] KARL FENNING,
*Acting Commissioner of Patents.*